United States Patent [19]
Suzuki et al.

[11] Patent Number: 5,783,289
[45] Date of Patent: Jul. 21, 1998

[54] SUBSTRATE FOR FORMING A LIQUID CRYSTAL DISPLAY PANEL AND A METHOD FOR ITS MANUFACTURE

[75] Inventors: Shunji Suzuki, Yokohama; Hiroyuki Ono, Fujisawa; Hiroyuki Kamiya, Sagamihara, all of Japan

[73] Assignee: International Business Machines Corporation, Armonk, N.Y.

[21] Appl. No.: 880,112

[22] Filed: Jun. 20, 1997

Related U.S. Application Data

[63] Continuation of Ser. No. 359,776, Dec. 20, 1994, abandoned.

[30] Foreign Application Priority Data

Dec. 20, 1993 [JP] Japan ................... 5-320064

[51] Int. Cl.$^6$ .................... B32B 3/00; B05D 5/00
[52] U.S. Cl. .................. 428/195; 428/1; 428/426; 349/158; 427/289; 427/164; 427/165
[58] Field of Search .................. 428/1, 426, 195; 349/158; 427/164, 165, 289, 293; 65/60.1, 112

[56] References Cited

U.S. PATENT DOCUMENTS 4,597,636  7/1986  Hoshikawa ........................ 359/82
4,906,071  3/1990  Takahara et al. ................. 359/82

Primary Examiner—Marie Yamnitzky
Attorney, Agent, or Firm—Ronald L. Drumheller

[57] ABSTRACT

A substrate for forming a liquid crystal display panel has panel forming areas 14 defined on a glass base plate 12. Patterns (such as wiring TAB areas 22) are defined on the glass base plate 12 within the panel forming areas. The panel forming areas and the patterns within the panel forming areas are defined in position and orientation with respect to a scribing line that passes through the center of the glass base plate such that when the glass base plate is divided along the scribing line, two base plates are formed that are identical to each other after one is rotated by 180 degrees. The resulting halves of the original base plate thus do not include the wasted area that conventionally needs to be cut off when the panel forming areas and patterns are not formed with such position and image symmetry. A large margin is also assured, which facilitates cutting and improves the production yield. It also allows the image area portion of the panel forming areas to be enlarged.

8 Claims, 3 Drawing Sheets

SUBSTRATE FOR FORMING A LIQUID CRYSTAL DISPLAY PANEL AND A METHOD FOR ITS MANUFACTURE

This is a continuation of application Ser. No. 08/359,776, filed Dec. 20, 1994 (now abandoned).

BACKGROUND OF THE INVENTION

1. Field of the Invention:

This invention relates to a substrate for forming a liquid crystal display panel, and a method for manufacturing it.

2. Related Art:

A liquid crystal display panel is utilized in various equipment such as an information display device. It is manufactured in such a manner that elements such as TFTs are drawn on a transparent base plate such as a transparent glass base plate to form an array base plate, and an opposite base plate such as a color filter base plate is mounted on the array base plate and enclosed in the liquid crystal.

The substrate for forming a liquid crystal display panel thus manufactured (such as an array base plate or a color filter base plate) is typically manufactured by forming a plurality of panel forming areas (for example, four) corresponding to the liquid crystal panel on a large glass base plate, drawing elements on each panel forming area to form an array base plate (a so-called four-panel formation), by cutting it into, for example, two halves to separate it into two array base plates, and by installing a color filter base plate or the like on each array base plate. This is performed in the product yield in the manufacturing process, for example, to reduce a problem where a good color filter is assembled with a defective array base plate. As a result, the production yield of the liquid crystal panel is improved as a whole.

Here, the conventional array base plate and its manufacturing method are described in detail, particularly for the state for setting a panel forming area, and the state for forming a pattern for drawing elements on each panel forming area by taking the socalled called four-panel formation referring to FIG. 3.

As shown in FIG. 3, for a conventional array base plate 50, for example, a handling area A (the cross-hatched area in FIG. 3) with a width a (for example, 10 mm) in the lateral direction of a transparent glass base plate 52 (for example, with a length of 360 mm and a width of 465 mm) is provided on the periphery of the transparent glass base plate 52 as a handling area for the transparent glass base plate 52 or a handling area necessary as a pattern-formation-inhibited area for a mask during exposure. Furthermore, four panel forming areas 54 (for example, with a length of 165 mm and a width of 215 mm) are provided adjacent to and within the handling area A. The panel forming area 54 is provided with a wiring TAB area 56, within which a margin area 58 for airtight sealing is provided. The inside of the margin area 58 constitutes an element area 60.

After the array base plate 50 is formed by forming a pattern with the drawing of an element on each panel forming area 54, the array base plate 50 is separated into two array base plates 50A and 50B by cutting it along scribing lines R1 and R2 with a necessary margin c from the panel forming area, and a cutout section B is cut out (primary break). Then, after a color filter base plate or the like is assembled in each of the array base plates 50A and 50B, the circumference of the panel forming area 54 is cut (secondary break) to form four liquid crystal panels.

Here, when such a so-called four-panel formation array base plate 50 is cut into halves and separated into two array base plates 50A and 50B, it is necessary to provide both array base plates 50A and 50B with exactly the same dimensions while maintaining a margin c (a width of 10 mm) necessary for wiring and the like. In such case, for the conventional array base plate 50, it is necessary not only to divide it into two at the scribing line R1 as described above but also to cut it at the scribing line R2 to remove the cutout section B.

This increases the number of manufacturing steps. Furthermore, the cutting itself is difficult to perform because the cutout section B has a small dimension (a width of 5 mm in the above-mentioned example), leading to deteriorate the yield. Above all, the cutout section B is totally wasted. In addition, the effectively available area of the transparent glass base plate 52 is reduced by the cutout section B, which also reduces the margin c necessary for wiring, and finally makes it difficult to cut out the area of margin c (secondary break).

As described above, because the cutout section B is an essential component of the conventional substrate for forming a liquid crystal display panel, it is difficult to perform the primary break to cut out the cutout section B and the secondary break to cut out the margin c, which deteriorates the yield and becomes a problem which is desired to be solved.

The present invention is made in view of the above-mentioned facts, and is intended to provide a substrate for forming a liquid crystal display panel and a manufacturing method for it, wherein a predetermined handling area is assured without changing the size of a transparent base plate, the portions necessary to be cut out from the transparent base plate are reduced, a margin for cutting the base plate is enlarged to facilitate cutting and to improve yield, and an image area may be enlarged if the margin for cutting the base plate remains the same.

SUMMARY OF THE INVENTION

The substrate in accordance with this invention is a substrate comprising a transparent base plate, predetermined handling areas formed on the periphery of the transparent base plate, and a plurality of panel forming areas disposed adjacent to the handling areas, a plurality of patterns being formed on each of the panel forming areas, wherein the transparent base plate has a point symmetrical shape when viewed from a plane, the plurality of panel forming areas on the transparent base plate and the plurality of patterns formed therein having a point symmetrical shape as a whole when viewed from a plane.

The method for manufacturing the substrate for forming a liquid crystal display panel according to the invention is a method for manufacturing a substrate comprising a transparent base plate, predetermined handling areas formed on the periphery of the transparent base plate, and a plurality of panel forming areas disposed adjacent to the handling areas, a plurality of patterns being formed on each of the panel forming areas, wherein the shape of the transparent base plate is geometrically arranged in a point symmetry when viewed from a plane, the pattern as a whole being geometrically arranged in the plurality of panel forming areas in point symmetry when viewed from a plane.

Predetermined handling areas are formed on the periphery of a transparent base plate. A plurality of panel forming areas are formed adjacent to the handling areas. Patterns such as TAB areas and pixel areas are formed in each panel forming area.

The transparent base plate has a point symmetrical shape when viewed from a plane, the plurality of panel forming areas on the transparent base plate and the plurality of patterns formed thereon having a point symmetrical shape as a whole when viewed from a plane.

Then, when the manufacturing process is moved to the subsequent step by cutting the substrate for forming a liquid crystal display panel into two separate substrates, each half of the substrate has exactly the same dimensions and patterns if the transparent base plate is cut at the center and one half is rotated by 180 degrees.

That is, it is not necessary to cut out the unnecessary cutout section B from the transparent base plate as in the conventional process, which shortens the manufacturing process (times of primary break) when compared to the conventional process, and the yield is not deteriorated.

Furthermore, because there is no cutout section, the effectively available area of the transparent base plate is not reduced by the cutout section so that it becomes possible to assure a large margin necessary for wiring and the like, and ultimately to easily cut out the margin (secondary break), which also improves the production yield.

Thus, for the substrate for forming a liquid crystal display panel according to the present invention, predetermined handling areas are assured without changing the size of the transparent base plate, the number of portions required to be cut out from the transparent base plate is reduced, a margin for cutting the base plate is enlarged to facilitate cutting and to improve production yield, and a panel forming area (image area) may be enlarged if the margin for cutting the base plate remains the same.

The transparent base plate is preferably formed in a rectangular shape so that it can be easily and accurately manufactured, and the handling area and the panel forming area can also be accurately formed.

The transparent base plate preferably is a glass base plate which can be easily and accurately manufactured.

The panel forming areas are preferably four in number so that these panel forming areas are formed with patterns (a so-called four-panel formation), then cut into two separate base plates on each of which other base plates are assembled to manufacture the liquid crystal display panel.

Therefore, in the manufacturing process, the possibility that a defective color filter is assembled with a defective array base place is reduced. As a result, the production yield of the liquid crystal panel is improved.

The transparent base plate may be a base plate on the array side drawn with elements and formed with a pattern. The transparent base plate also may be an opposed base plate disposed with color filters and formed with a pattern. Therefore, the range of application is expanded.

The shape of the transparent base plate is geometrically arranged in a point symmetry when viewed from a plane. The predetermined handling areas are then formed on the periphery of the transparent base plate. Moreover, a plurality of panel forming areas are disposed adjacent to the handling areas, and geometrically in a point symmetry as a whole when viewed from a plane. In addition, patterns such as TAB areas and pixel areas are geometrically formed in a point symmetry as a whole on each of the panel forming areas. Thus, the substrate for forming a liquid crystal display panel is manufactured.

Therefore, when the manufacturing process is moved to the subsequent step by cutting the substrate for forming a liquid crystal display panel into two separate substrates, each half of the substrate has exactly the same dimensions and patterns if the transparent base plate is cut at its center and rotated 90 degrees.

That is, it is not necessary to cut out the unnecessary cutout section from the transparent base plate as in the conventional process, which shortens the manufacturing process (times of primary break) when compared to the conventional process, and the yield is not deteriorated.

Furthermore, because there is no cutout section, the effectively available area of the transparent base plate is not reduced by the cutout section so that it becomes possible to assure a large margin necessary for wiring and the like, and ultimately it becomes easy to cut out the margin (secondary break), which also improves the production yield.

Thus, for the method for manufacturing the substrate for forming a liquid crystal display panel according to the present invention, predetermined handling areas are assured without changing the size of the transparent base plate, the number of portions required to be cut out from the transparent base plate is reduced, a margin for cutting the base plate is enlarged to facilitate cutting and to improve production yield, and a panel forming area (image area) may be enlarged if the margin for cutting the base plate remains the same.

DETAILED DESCRIPTION OF THE PREFERRED EMBODIMENT

An embodiment of the present invention will be explained by referring to FIGS. 1 and 2.

Figure 1:
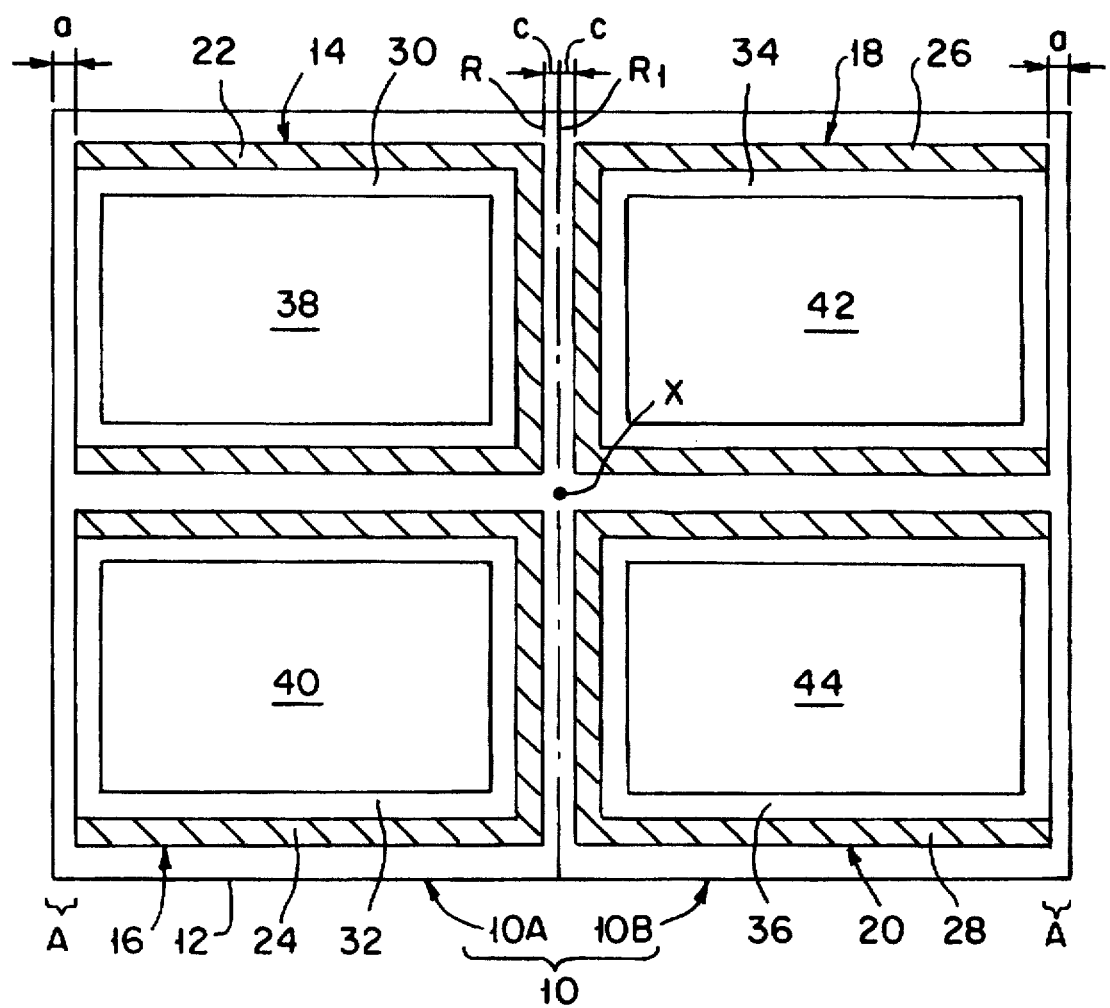
FIG. 1 is a plan view showing the formation of panel forming areas for a substrate for forming a liquid crystal display panel according to an embodiment of the present invention, and the formation of patterns on each panel forming area.

FIG. 1 shows a liquid crystal display panel forming substrate 10 (array base plates 10A and 10B) according to an embodiment of the present invention.

The liquid crystal display panel forming substrate 10 is arranged in a so-called four-panel formation, and has a glass base plate 12 as a transparent base plate. The glass base plate 12 is geometrically formed in a rectangle in a point symmetry with respect to a center point X when viewed from a plane and has, for example, a length of 360 mm and a width of 465 mm.

Predetermined handling areas A (width a =10 mm) necessary for handling or as a mask during exposure are formed on the periphery of the glass base plate 12. In addition, four panel forming areas 14, 16, 18, and 20 are formed adjacent to and between the handling areas A. Each of these panel forming areas 14, 16, 18, and 20 has a length of 165 mm and a width of 215 mm. Therefore, a margin c necessary for wiring or the like formed between the array base plate 10A (panel forming areas 14 and 16) and the array base plate 10B (panel forming areas 18 and 20) is assured to have a width of 7.5 mm.

Furthermore, these panel forming areas 14, 16, 18, and 20 are formed with wiring TAB areas 22, 24, 26, and 28, respectively, and formed thereon with airtight sealing margin areas 30, 32, 34, and 36. The insides of the margin areas 30, 32, 34, and 36 constitute pixel areas 38, 40, 42, and 44.

Here, the panel forming areas 14, 16, 18, and 20 on the glass base plate 12, and the patterns formed on these panel forming areas 14, 16, 18, and 20 (the wiring TAB areas 22, 24, 26, and 28, the margin areas 30, 32, 34, and 36, as well as the pixel areas 38, 40, 42, and 44) when considered as a whole are geometrically arranged in a point symmetry with respect to the center point X of the glass base plate 12 when viewed from a plane. For example, for the array base plate 10A, the wiring TAB areas 22 and 24 formed in the panel forming areas 14 and 16 do not have a left side, and are arranged in a U shape facing to the left. In contrast, for the array base plate 10B, the wiring TAB areas 26 and 28 formed in the panel forming areas 18 and 20 do not have a right side, and arranged in a U shape facing to the right.

Next, this embodiment will be explained according to the liquid crystal display panel forming substrate 10 and the procedure for manufacturing a liquid crystal display panel using such substrate.

For the liquid crystal display panel forming substrate 10 with the above arrangement, the glass base plate 12 is geometrically formed in point symmetry when viewed from a plane. Then, the handling areas A are formed in the periphery of the glass base plate 12. Furthermore, four panel forming areas 14, 16, 18, and 20 are formed adjacent to the formed handling areas A geometrically in a point symmetry when viewed from a plane. Also, the patterns such as the wiring TAB areas 22, 24, 26, and 28 and the pixel areas 38, 40, 42, and 44 are formed as a whole on each of the panel forming areas 14, 16, 18, and 20 geometrically in a point symmetry when viewed from a plane. Furthermore, elements such as TFTs are drawn on each of the panel forming areas 14, 16, 18, and 20, and the liquid crystal display panel forming substrate 10 shown in FIG. 1 is manufactured.

Figure 2:
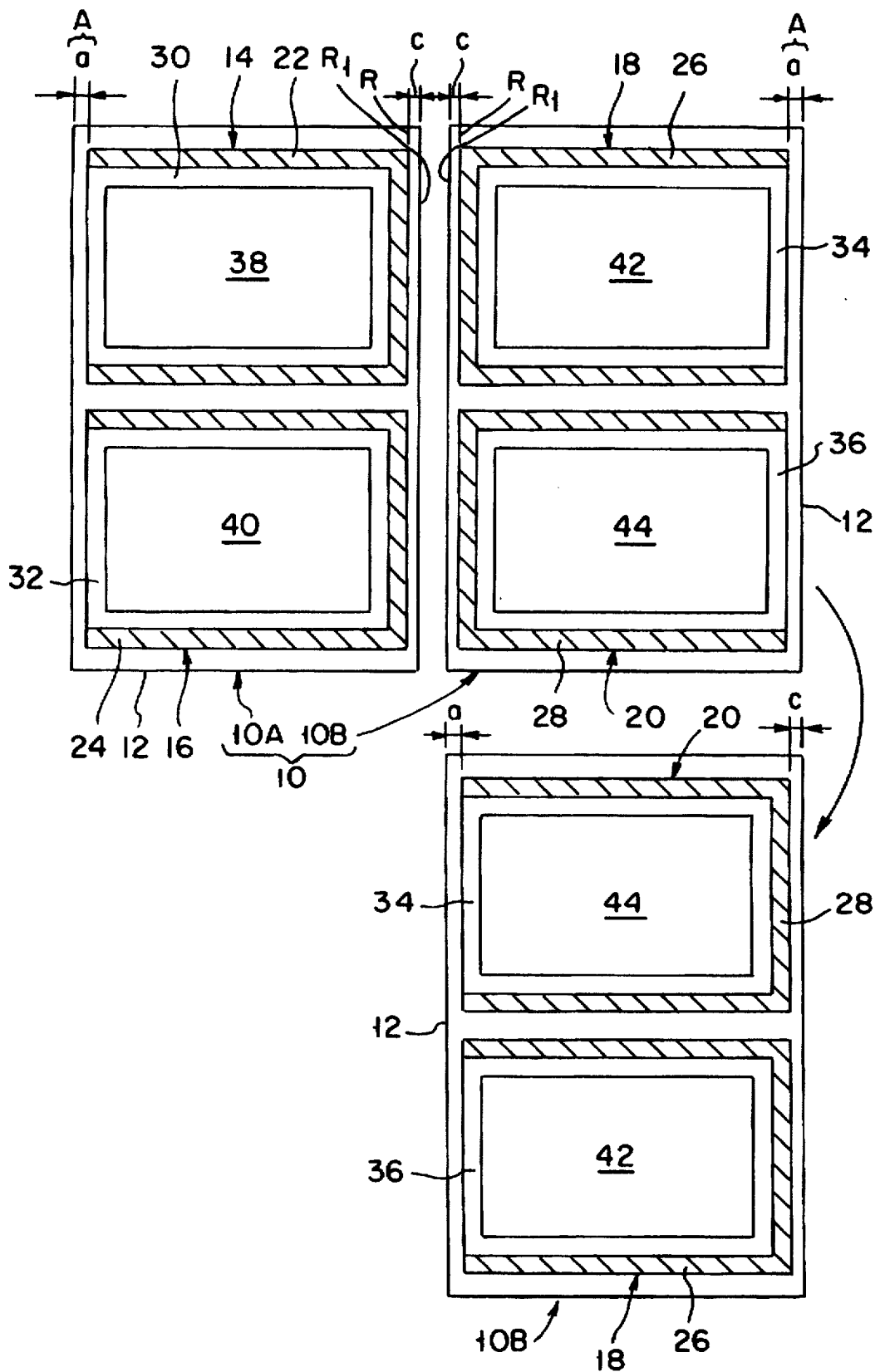
FIG. 2 is a plan view showing the substrate for forming a liquid crystal display panel according to an embodiment of the present invention which is divided into two halves by the primary break.
Figure 3:
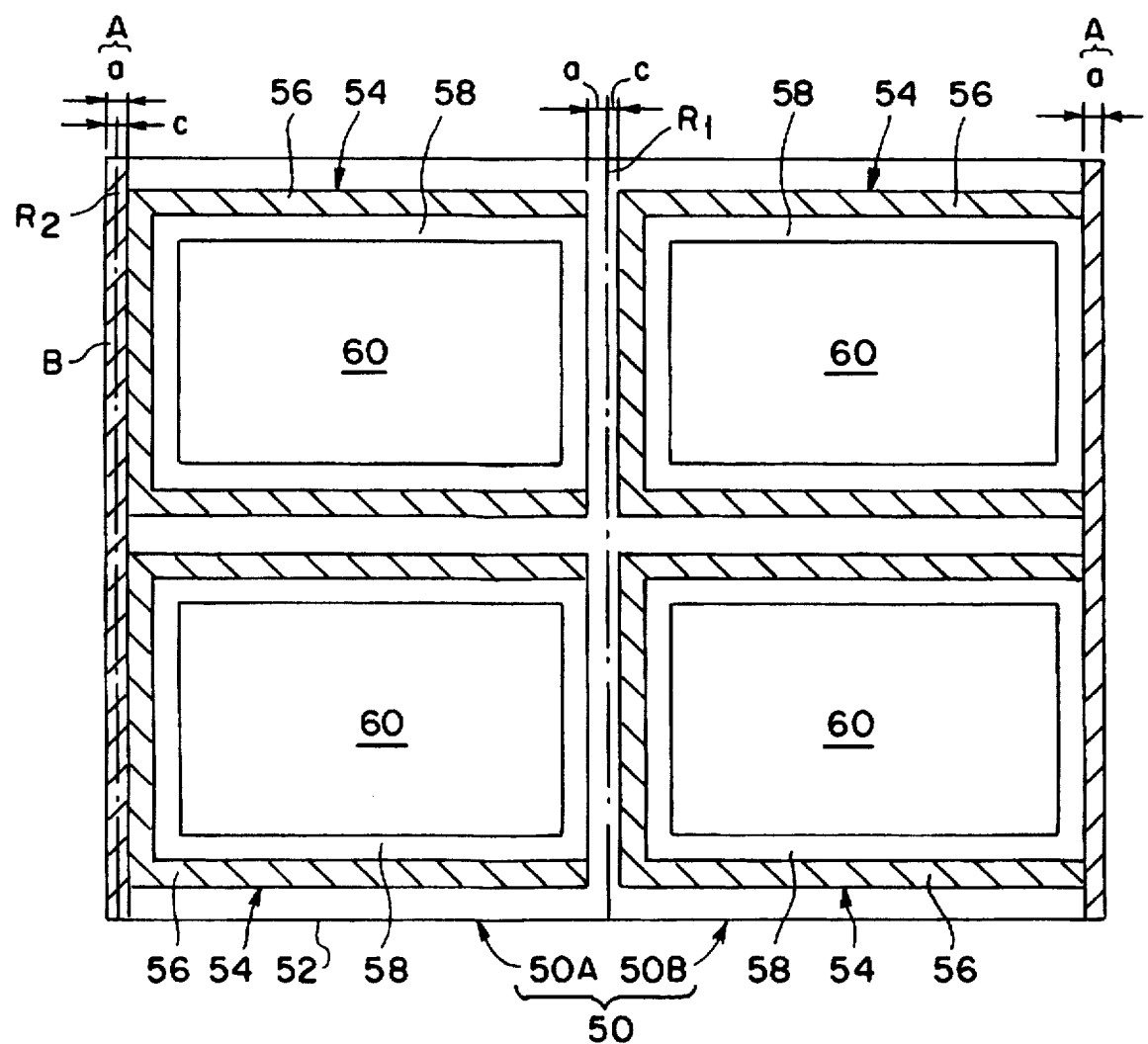
FIG. 3 is a plan view showing the formation of panel forming areas for a conventional substrate for forming a liquid crystal display panel, and the formation of patterns on each panel forming area.

In addition, after the liquid crystal display panel forming substrate 10 (the array base plates 10A and 10B) is manufactured by forming the patterns on each of the panel forming areas 14, 16, 18, and 20, it is cut and separated into two array base plates 10A and 10B along a scribing line Ri as shown in FIG. 2 (primary break).

Then, four liquid crystal display panels are manufactured by assembling a color filter base plate on each of the cut and separated array base plates 10A and 10B, cutting around each of the panel forming areas 14, 16, 18, and 20 along the scribing line R and the like (secondary break), and enclosing them in liquid crystal.

Here, because the liquid crystal display panel forming substrate 10 has, as described above, a glass base plate 12, a plurality of the panel forming areas 14, 16, 18, and 20 on the glass base plate 12, and a plurality of patterns formed on the panel forming areas 14, 16, 18, and 20 which are formed as a whole geometrically in a point symmetry in respect to the center point X of the glass base plate 12, when the manufacturing process is moved to the subsequent step by subsequently cutting the liquid crystal display panel forming substrate 10 into halves of two separate array base plates 10A and 10B, the separated array base plates 10A and 10B have exactly the same dimensions and patterns as shown in FIG. 2 by cutting the glass base plate 12 at the center (the scribing line R1) (only by inverting after cutting).

That is, in the liquid crystal display panel forming substrate 10, it is not necessary to cut out the unnecessary cutout section from the glass base plate 12 as in the conventional process so that the manufacturing process is shortened (times of primary break) when compared to the conventional process, and the yield is not deteriorated.

Furthermore, because there is no cutout section, the effectively available area of the glass base plate 12 is not reduced by the cutout section so that it becomes possible to assure the margin c necessary for wiring or the like in a large size. For example, in the abovementioned embodiment, the margin c has a width of 7.5 mm, which is much larger than the conventional one using the glass base plate 12 with the same dimensions. In addition, this ultimately makes it possible to easily perform the secondary break for cutting out the margin, which also improves the yield.

Thus, for the liquid crystal display panel forming substrate 10, the predetermined handling areas A are assured without changing the size of the glass base plate 12, the number of portions required to be cut out from the transparent base plate is reduced, a margin c for cutting the base plate is enlarged to facilitate cutting and to improve production yield. On the contrary, panel forming areas 14, 16, 18, and 20 (image areas) may be enlarged if the margin c for cutting the base plate remains the same as the conventional one.

Although, in this embodiment, the liquid crystal display panel forming substrate 10 has four panel forming areas formed on the glass base plate 12 (in so-called four-panel formation), then is divided into two, the array base plates 10A and 10B, and a liquid crystal display panel is manufactured, the present invention is not limited to such arrangement, but may be arranged in such a manner that the glass base plate 12 is formed with two panel forming areas (in a so-called two-panel formation), and then divided into two to manufacture a liquid crystal display panel. In addition, more panel forming areas may be formed on the glass base plate.

In addition, the dimensions of the liquid crystal display panel forming substrate 10, the panel forming areas 14, 16, 18, and 20, the handling areas A, and the margin c are not limited to those in the above embodiment, but may be determined as is appropriate.

Furthermore, although the above embodiment has been described for the array base plate for forming a liquid crystal display panel as the liquid crystal display panel forming substrate on which patterns are formed by drawing elements such as TFTs, the present invention is not limited to such an arrangement, but may be applied to an opposed base plate (a color filter base plate) on which a color filter for forming a liquid crystal display panel is arranged to form patterns. In such a case, the margin for cutting the glass can be also enlarged so that the cutting of the glass is facilitated, the production yield is improved, and the image area can be increased.

As described above, the substrate for forming a liquid crystal display panel and the method for manufacturing it have such significant advantages that a predetermined handling area is assured without changing the size of the transparent base plate, the number of portions required to be cut out from the transparent base plate is reduced, a margin for cutting the base plate is enlarged to facilitate cutting and to improve production yield, and an image area may be enlarged if the margin for cutting the base plate remains the same.

We claim:

1. An improved substrate for liquid crystal display panels having a plurality of panel forming areas disposed on a transparent base plate, the panel forming areas having a plurality of patterns therein, at least one of said patterns being asymmetric such that said one pattern is not identical with itself when rotated 180 degrees, and a scribing line being defined along which the transparent plate later is divided to form two parts, at least one of the two parts normally requiring trimming in order to make the two parts identical for further processing, the improved substrate not requiring any trimming of either one of the two parts in order to make the two parts identical, wherein:

the panel forming areas are symmetrically positioned with respect to the scribing line; and the patterns in the panel forming areas on one side of the scribing line are identical with the patterns in the panel forming areas on the other side of the scribing line but have an orientation that is rotated 180 degrees with respect to the patterns in the panel forming areas on the other side of the scribing line so that said one pattern on the one side of the scribing line corresponds with a pattern on the other side of the scribing line that is oriented upside down, whereby the two parts of the transparent plate formed by dividing the transparent plate along the scribing line are identical when one of the two parts is rotated by 180 degrees with respect to the other one of the two parts without any trimming being required of either one of the two parts.

2. A substrate for forming a liquid crystal display panel according to claim 1, wherein said transparent base plate is of a rectangular shape.

3. A substrate for forming a liquid crystal display panel according to claim 1, wherein said transparent base plate is a glass base plate.

4. A substrate for forming a liquid crystal display panel according to claim 1, wherein the panel forming areas on said transparent base plate are four in number.

5. A substrate for forming a liquid crystal display panel according to claim 1, wherein each of the panel forming areas of said substrate contains a pattern for an array side base plate of a liquid crystal display panel.

6. A substrate for forming a liquid crystal display panel according to claim 1, wherein each of the panel forming areas of said substrate contains a pattern for an opposed base plate carrying color filters for a liquid crystal display panel.

7. An improved method for manufacturing substrates for liquid crystal display panels in which parallel handling areas are disposed on the periphery of a transparent base plate, a plurality of panel forming areas are disposed between the handling areas, a plurality of patterns are formed on the panel forming areas, at least one of said patterns being asymmetric such that said one pattern is not identical with itself when rotated 180 degrees, the transparent plate is then divided into two parts along a scribing line between and parallel to the handling areas and at least one of the parts normally is then trimmed to make the two parts identical for further processing, the improvement in which the trimming step is eliminated, comprising the steps of:

disposing the panel forming areas symmetrically with respect to the scribing line; and forming the patterns in the panel forming areas on one side of the scribing line identical with the patterns in the panel forming areas on the other side of the scribing line but with an orientation that is rotated 180 degrees with respect to the patterns formed in the panel forming areas on the other side of the scribing line so that said one pattern on the one side of the scribing line corresponds with a pattern on the other side of the scribing line that is oriented upside down, whereby the two parts of the transparent plate formed in the dividing step are identical without any trimming when one of the two parts is rotated by 180 degrees with respect to the other one of the two parts.

8. An improved method for manufacturing substrates for liquid crystal display panels in which a plurality of panel forming areas are disposed on a transparent base plate, a plurality of patterns are formed on the panel forming areas, at least one of said patterns being asymmetric such that said one pattern is not identical with itself when rotated 180 degrees, the transparent plate is then divided into two parts along a scribing line and at least one of the parts normally is then trimmed to make the two parts identical for further processing, the improvement in which the trimming step is eliminated, comprising the steps of:

disposing the panel forming areas symmetrically with respect to the scribing line; and forming the patterns in the panel forming areas on one side of the scribing line identical with the patterns in the panel forming areas on the other side of the scribing line but with an orientation that is rotated 180 degrees with respect to the patterns formed in the panel forming areas on the other side of the scribing line so that said one pattern on the one side of the scribing line corresponds with a pattern on the other side of the scribing line that is oriented upside down, whereby the two parts of the transparent plate formed in the dividing step are identical without any trimming when one of the two parts is rotated by 180 degrees with respect to the other one of the two parts.

* * * * *